April 11, 1950　　　F. T. KERN　　　2,503,875
LIQUID-SOLIDS SEPARATOR
Filed Dec. 22, 1947　　　　　　　2 Sheets-Sheet 1
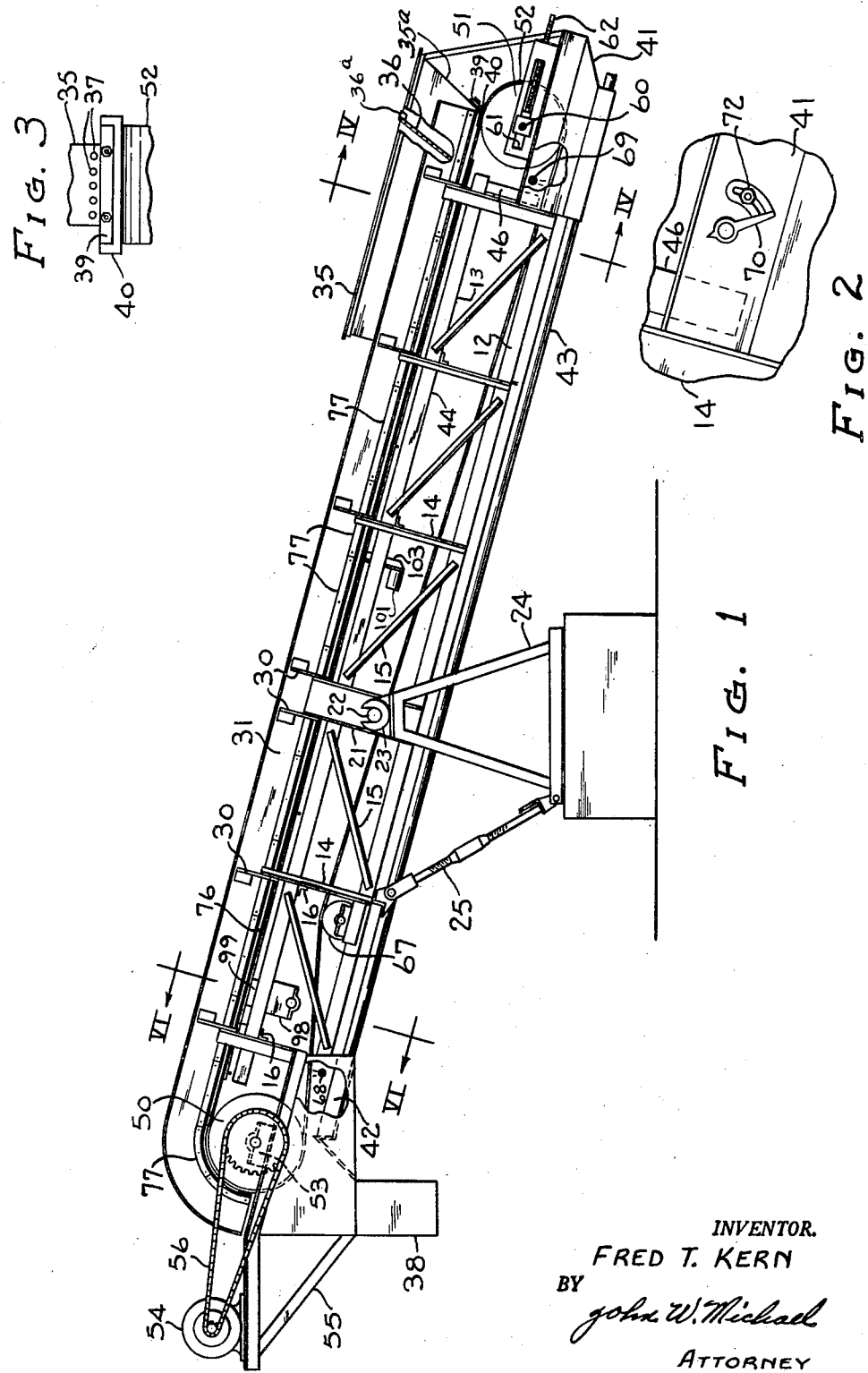
INVENTOR.
FRED T. KERN
BY
John W. Michael
ATTORNEY April 11, 1950     F. T. KERN     2,503,875
LIQUID-SOLIDS SEPARATOR
Filed Dec. 22, 1947     2 Sheets-Sheet 2
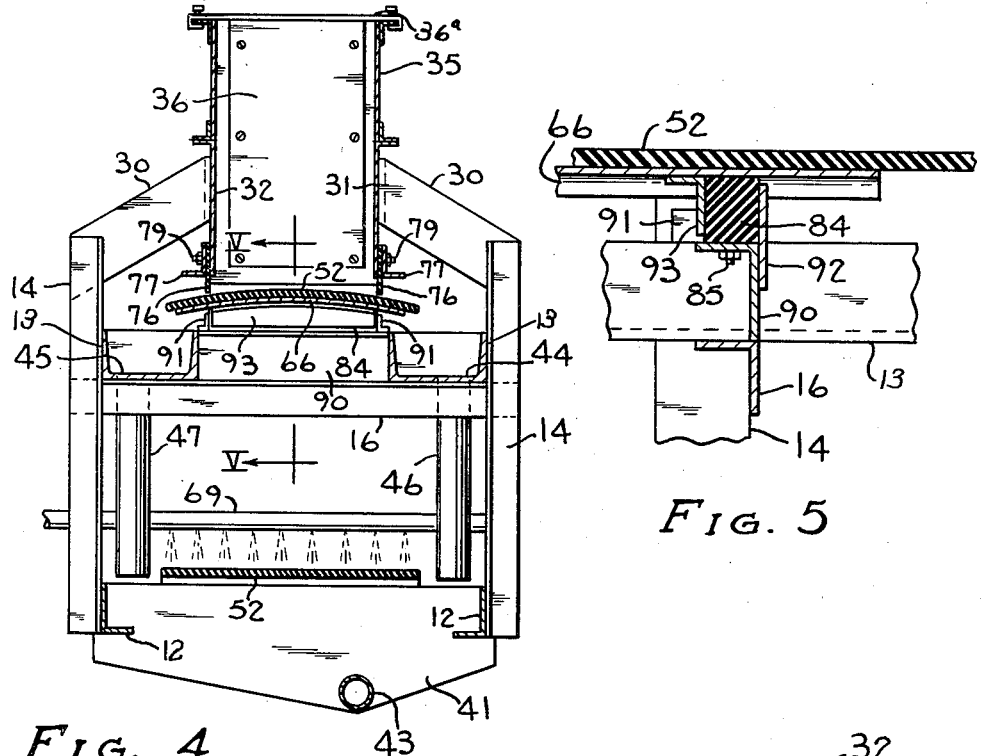
FIG. 4
FIG. 5
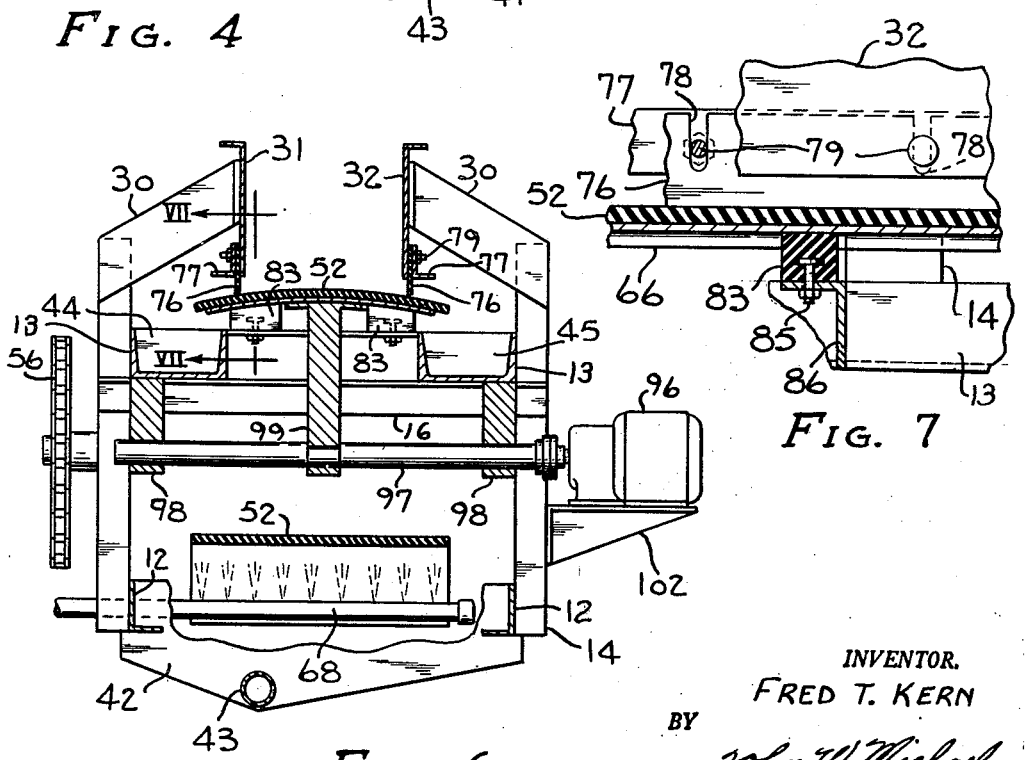
FIG. 6
FIG. 7
INVENTOR.
FRED T. KERN
BY John W. Michael
ATTORNEY Patented Apr. 11, 1950

2,503,875

UNITED STATES PATENT OFFICE 2,503,875

LIQUID-SOLIDS SEPARATOR

Fred T. Kern, Milwaukee, Wis.

Application December 22, 1947, Serial No. 793,221

7 Claims. (Cl. 210—51)

This invention relates to improvements in devices for separating a liquid from solids and particularly from solids of relatively small particle size.

One such device, consisting of an inclined conveyor belt on the upper run of which is mounted a material guiding trough, is described and claimed in Patent No. 2,314,542, issued March 23, 1943, to Fred T. Kern, the applicant herein. However in the device of the patent the water or other liquid which did not flow off the low end of the conveyor was drained off laterally through drainage slots at the lower edges of the trough forming walls. The liquid so delivered was caught in a drain channel formed by double skirt boards. The conveyor of the patent being pivoted at its low end has a limited range of selectable angles of inclination. These characteristics restricted its use to dewatering of solids of a limited range of sizes and shapes and also prevented the device from reaching a high degree of dewatering. Too high a percentage of fines were returned with the drain water and there was also a thin underlying stratum of very wet fines which needed to be separated from the main bulk of solids by a scraper at the upper end of the conveyor.

It is, therefore, an object of the present invention to provide a simply constructed, readily operable and easily maintained device for efficiently removing liquid from a mixture of liquid and solids and particularly from solids of small size.

Another object of the invention is to provide a device for deliquefying various mixtures of liquids and solids which vary in size and shape over a wide range.

A still further object of the invention is to provide a device particularly adapted to remove liquids from solids-liquid mixtures which are highly fluid, have high surface tension and have such other characteristics as to be difficult to handle by the means now known.

These objects are obtained by: mounting the frame on a centrally located pivot thereby increasing greatly the range of its selectable angles of inclination; providing a continuous crowned support for the upper run of the conveyor which support is so mounted that it and the upper run may be vibrated independently of the frame at a variety of selected frequencies and strokes; and placing gutters under the sides of the supporting member and upper run of the conveyor. With this arrangement the dewatering is accomplished by draining off the water at the lower end of the conveyor under the influence of gravity, as the material is carried up the conveyor. The vibrational movement of the mass greatly increases the dewatering action of the device. Simplification of structure arises from the use of gutters beneath the upper run rather than double skirt walls. This together with the use of a continuous crowned supporting member increases the effectiveness of the gravitational dewatering even if the vibrating mechanism is not utilized. When the device is used with the vibrational mechanism in operation the angle of inclination is lessened whereas it may be increased when only straight gravitation is used. Thus a wide range of adjustability of the angle of inclination is needed.

Objects and advantages other than those above set forth will be apparent from the following description when read in connection with the accompanying drawing in which:

Fig. 1 is a side elevation, with parts broken away, of one embodiment of the present invention;

Fig. 2 is an enlarged fragmentary view of Fig. 1;

Fig. 3 is a fragmentary view in and elevation of the right end of Fig. 1;

Fig. 4 is a cross sectional view on the plane of line IV—IV of Fig. 1;

Fig. 5 is a cross section taken on the plane of line V—V of Fig. 4;

Fig. 6 is a cross section on the plane of line VI—VI of Fig. 1; and

Fig. 7 is a cross section on the plane of line VII—VII of Fig. 6.

Generally, the present device includes a frame pivotally mounted substantially centrally of the longitudinal axis thereof and provided with means for adjusting the angularity thereof relative to the horizontal. An open top trough is formed on the frame by side plates extending toward but spaced from an endless belt forming the bottom of the trough. The belt is mounted on pulleys and rollers for movement by power means and the upper or material carrying reach of the belt is further supported substantially throughout in sliding relation on a crowned member extending between the pulleys, beyond the sides of the trough and over gutters extending along the trough sides, the belt also extending beyond the edges of the slide. The space between the side plates and the outer surface of the upper belt reach may be closed to any extent desired by flexible skirt strips divided into sections and adjustably mounted on the side plates.

The outer and inner sides of the return reach of the belt are subjected to sprays of the same liquid as is used in a solids-liquid mixture to be separated and the sprays are adjustable to vary the angle of impingement thereof on the belt. The fines washed off the belt by the sprays pass into the side gutters and all of such fines are collected to the same point from which they may again be subjected to the deliquefying action of the present device or to other means for separating the solids from the liquid.

The upper reach of the belt, when conditions require, is subjected to vibration by applying impulses thereto of such strokes and frequencies as is desirable depending upon the materials to be separated. Vibration may be produced mechanically or electrically and the vibrating means are preferably adjustable so that the degree of vibration may be varied within given ranges as is well known.

Referring particularly to the drawings, similar side frame sections are formed by lower longitudinal frame members 12 and upper longitudinal frame members 13 held in spaced relation by members 14 and braces 15 extending between the longitudinal members in such manner that the frame sections are truss-like structures of light weight but considerable rigidity. The two side frame sections are joined by cross members to complete a frame on which all other portions of the structure are mounted. The frame sections are each provided substantially centrally thereof with a member 21 of considerable strength for mounting a pivot 22 extending laterally from the frame sections for reception in bearings 23 on a pillar frame 24. An adjustable bar 25 is pivotally connected at one end with the frame and is pivotally connected at the other end to pillar frame 24 to vary the degree of angularity of the device with the horizontal dependent on the materials to be separated. Brackets 30 extend toward each other at an angle from the frame spacers 14 to support side plates 31, 32 extending longitudinally of the frame in substantially parallel relation to form the side walls of an open topped trough.

A hopper 35 is mounted on the trough side plates 31, 32 at one end thereof and has a partition 36 mounted therein with a supporting arm 36a adjustably slidable on the top of the hopper 35 to vary the area of the opening between the partition and the upper end (lefthand as viewed in Fig. 1) of the hopper 35 through which the solids-liquid mixture may be supplied to the material carrying element of the device. The partition may be fitted about its edges with flexible strips (not shown) for sealing the partition in tight relation in the hopper. The bottom of the partition 36 is spaced from the top of the belt 52 so that liquid removed from the voids (spaces between solids) may pass under the partition and be discharged downwardly (to the right as viewed in Fig. 1) through openings 37 in the end 35a of the hopper 35 into the collecting basin 41. The lower edge of end 35a has a rubber-like seal 40 (Fig. 3) held by a plate 39 to the end. This seal seats on the belt 52 to prevent solids from falling out of the hopper. Solids are discharged from the end of the device opposite the hopper 35, into a discharge receiver 38 from which the solids are taken as desired. Collecting basins 41, 42 are placed at both ends of the frame and are connected by a conduit 43 for a purpose to be described, and the frame members 13 form gutters 44, 45 along the sides of the trough which ends in spouts 46 leading into the basin 41 at the lower end of the device.

Similar pulleys 50, 51 are severally mounted adjacent the two ends of the device to receive and endless belt 52, the upper or head pulley 50 being mounted in fixed bearings 53 and being driven by suitable means herein indicated as a motor 54 mounted on a bracket 55 extending from the frame, the motor being connected with the pulley 50 by a sprocket chain 56. The bottom or foot pulley 51 is mounted in bearings 60 severally movable in slides 61 and adjustable therein as by screw 62 to adjust the tension on the belt 52. The upper reach of the belt 52 running over the tops of the pulleys and coacting with the side plates 31, 32 and with the other means to be described, provides an outer surface for receiving material from the hopper and for carrying the material to the discharge or head end of the device. Such upper reach of belt 52 slides on a crowned support 66 carried within the frame in the manner hereinafter described and extending between the pulleys 50, 51 and of such width as to extend partially over the side gutters 44, 45 and of such length as to provide continuous support for the belt substantially throughout the length of the upper reach. The belt 52 is of such width as to extend slightly beyond the side edges of the crowned support 66. This permits the immediate discharge of any lateral drainage between the bottom of the side plates 31, 32 and the belt. The bottom or return reach of the belt is supported on one or more rollers 67 mounted in the frame, such roller or rollers being preferably so located as to guide the belt free from contact with the collecting basins and frame. Sprays 68, 69 of liquid may be directed to clear the outer and inner sides respectively of the belt return reach. Each of the spray pipes is preferably adjustably mounted in the frame (see Fig. 2) and is provided with an arm 70 slotted for clamping in various positions relative to the bolts 72.

The edges of the trough side plates 31, 32 and of the belt 52 may be adjusted as desired by skirt strips (see Fig. 7) which comprise flexible strips 76 mounted on the trough sides by clamp plates 77. The skirt strips are slotted as at 78 to receive bolts passing through holes in the trough side plates through the skirt slots and through holes in the clamp plates 77, the skirt strips and clamp plates being divided into sections longitudinally of the trough so that the spacing of any particular skirt strip or pair of strips may be adjusted relative to the belt. When the device is used without the vibration mechanism in operation the strips 76 may be spaced a greater amount than when such mechanism is used. The spacing depends upon the condition of the material being dewatered.

With many types of material and under certain conditions of wetness of the same material, it is preferable to vibrate the material carrying reach or upper run of the belt. The crowned support 61 is resiliently mounted in the frame by resilient mountings which may take the form of blocks 83, 84 of rubber or rubber-like material at the head and foot ends of the slide respectively. The head blocks 83 are each provided with bolts 85 by which the blocks may be fixed on a cross plate 86 mounted on the adjacent edges of the upper longitudinal frame members 13 to support the slide adjacent its side edges. The foot block 84 is required to take end thrust from the crowned support 66 as well as to provide a mounting for the load on the slide and belt and is preferably a single block substantially enclosed in an open-topped box-like structure with some of the sides spaced to allow resilient action of the block. The box bottom plate 90, end plates 91 and back plate 92 are fixed on the frame while the front plate 93 is fixed on the slide 66, the edges of the back and end plates adjacent the slide and the front plate, and the edge of the front plate adjacent the bottom plate being spaced so that the block may distort freely as required.

The means for vibrating the crowned support 66 are herein shown as a motor 96 driving a shaft 97 in bearings 98 on the frame with the shaft eccentrically connected with a crank 99 which may be fixed at one end to the slide if positive movement of the slide is required in both directions of vibration. However, the crank may be free from the slide so as to deliver blows thereto for positively moving the slide in only one direction, if desired. A mechanical vibrator such as described is, of course, limited to a particular range of vibration even if means are provided between the motor 96 and the shaft 97 for varying the speed of rotation of the shaft. When the material contains solids of low specific gravity, such as coal in water, the frequency is relatively slow. If the materials contain solids of high specific gravity, such as copper concentrates in water, then the frequencies are relatively high. If necessary, the mechanical vibrator may be replaced or supplemented by electric vibrator means diagrammatically illustrated at 101 having a higher range of vibration. The vibrating means 101 may be located as desired on the crowned support 66 by brackets indicated at 103 in any number desired.

It will thus be seen that the present invention may be effectively used to remove a liquid from some materials without vibration and may be easily combined with vibrating means whenever the separation of a particular liquid and solids requires vibration. Known vibrating means may be used to vary both the frequency of the impulses and the "throw" applied to the structure which together with adjustment of the hopper discharge area, the angularity of the separator and the spacing of the skirt from the belt, permits separation of substantially any liquid from any solid. The device as a whole is relatively simple to manufacture, may be successfully operated by the most unskilled labor and is easily adjustable to act on a large variety of materials.

Although but one embodiment of the present invention has been illustrated and described, it will be apparent to those skilled in the art that various changes and modifications may be made therein without departing from the spirit of the invention or from the scope of the appended claims.

I claim:

1. A device for separating materials comprising a frame, side plates mounted in and extending longitudinally of the frame, a belt mounted in the frame and having an inclined reach with a material carrying surface coacting with the side plates to form substantially a trough, the edges of the side plates being spaced from the material carrying surface of the belt, gutters extending longitudinally below and adjacent the sides of the trough, means for driving the belt, and a crowned support mounted in the frame for slidingly supporting the material carrying reach of the belt in crowned relation, the longitudinal edges of the belt and of the support extending partially over the gutters.

2. A device for separating materials comprising a longitudinally inclined open-topped trough having side plates and a bottom, said bottom comprising the upper reach of an endless belt, said upper reach extending laterally beyond the outer sides of said side plates, gutters extending below the outer edges of said upper reach to collect material washed out from said trough between said upper reach and said side plates, means for driving said belt, and means for longitudinally supporting said upper reach.

3. A device for separating materials comprising a frame, side plates mounted in and extending longitudinally of the frame, a belt mounted in the frame and having an inclined reach with a material carrying surface spaced from the side plates to form substantially a trough, gutters extending along and below the side plates, means for driving the belt, a crowned support mounted in the frame for slidingly supporting the material carrying reach of the belt in a crowned position, the longitudinal edges of the belt and of the slide extending partially over the gutters, and skirt strips mounted on the side plates for adjustment in edgewise relation toward the material carrying surface of the belt for regulating the space between the edges of the side plates and said belt surface.

4. In a device for separating liquids from solids, a frame, side plates mounted on the frame and extending longitudinally of the frame, a belt mounted in the frame and coacting with the side plates to form an inclined trough for conveying materials, means for driving the belt, a support for slidingly supporting the material carrying portion of the belt, means for resiliently mounting said support in the frame, and means for vibrating said support member and the portion of the belt resting thereon.

5. In a device for separating liquids from solids, a frame, side plates mounted on and extending longitudinally of the frame, a belt mounted in the frame and coacting with the side plates to form an inclined trough for conveying materials, means for driving the belt, a crowned support mounted in the frame for slidingly supporting the material carrying reach of the belt in crowned position, gutters outside of and extending along the trough, the longitudinal edges of the belt and support extending partially over the gutters, means for resiliently mounting the support in the frame, and means for vibrating the support and the material carrying reach of the belt.

6. In a device for separating liquids from solids, a pivoted frame, side plates mounted on and extending longitudinally of the frame, a belt mounted in the frame cooperating with the side plates to form substantially a trough for conveying materials, means for driving the belt, a crowned support mounted in the frame for slidingly supporting the material carrying reach of the belt in crowned position, gutters outside of and extending along the trough, the longitudinal edges of the belt and support extending partially over the gutters, means for resiliently mounting support in the frame, means mounted on the frame for vibrating the support and the material carrying reach of the belt, and means for pivoting the frame to obtain a desired angle of inclination of the said trough.

7. The device claimed in claim 6 in which the pivot is located centrally of said frame.

FRED T. KERN.

REFERENCES CITED

The following references are of record in the file of this patent:

UNITED STATES PATENTS

| Number | Name | Date |
| --- | --- | --- |
| 1,773,479 | Escher | Aug. 19, 1930 |
| 1,957,168 | Hyde | May 1, 1934 |
| 2,140,833 | Flynn | Dec. 20, 1938 |
| 2,239,076 | Biedess | Apr. 22, 1941 |
| 2,314,542 | Kern | Mar. 23, 1943 |